United States Patent
Pao (10) Patent No.: US 8,295,164 B2
(45) Date of Patent: Oct. 23, 2012

(54) NETWORK-CONNECTION REDUNDANT SYSTEM FOR DEVICES WITH CASCADE NETWORKING CAPABILITY AND METHOD APPLIED ON THE SYSTEM

(75) Inventor: Chih-Hsiung Pao, Sindian (TW)

(73) Assignee: Etherwan Systems, Inc., Sindian (TW)

( * ) Notice: Subject to any disclaimer, the term of this patent is extended or adjusted under 35 U.S.C. 154(b) by 233 days.

(21) Appl. No.: 12/732,454

(22) Filed: Mar. 26, 2010

(65) Prior Publication Data

US 2011/0235506 A1     Sep. 29, 2011

(51) Int. Cl.
*G01R 31/08* (2006.01)
(52) U.S. Cl. .......................... 370/225; 370/400
(58) Field of Classification Search .................. 370/216, 370/225
See application file for complete search history.

(56) References Cited

U.S. PATENT DOCUMENTS

| | | | |
|---|---|---|---|
| 6,611,892 B1 * | 8/2003 | Sasaki et al. | 710/306 |
| 2007/0076590 A1 * | 4/2007 | Galpin et al. | 370/216 |
| 2008/0107017 A1 * | 5/2008 | Yuan et al. | 370/228 |

* cited by examiner

*Primary Examiner* — Jung Park
(74) *Attorney, Agent, or Firm* — C. G. Mersereau; Nikolai & Mersereau, P.A.

(57) ABSTRACT

Disclosed is a network-connection redundant system for devices with cascade networking capability, and a method applied on the system. Every device capable of network connection preferably has two network ports, which are respectively connected to the same or different network nodes. The route of network packets can be controlled by defining the roles of ports. One emergent redundant connection is achieved. According to the preferred embodiment, every port is defined as one role such as forward port or blocked port after the network formed by the nodes and devices is initialized. It is featured that a plurality of connection-confirmation packets periodically transmitted or received by the network nodes are used to determine whether state of the connection changes or not. If there is any change, the role for each port is re-defined based on the relevant information. A redundant connection is then established.

9 Claims, 10 Drawing Sheets

NETWORK-CONNECTION REDUNDANT SYSTEM FOR DEVICES WITH CASCADE NETWORKING CAPABILITY AND METHOD APPLIED ON THE SYSTEM

BACKGROUND OF THE INVENTION

1. Field of the Invention

The present invention generally relates to a redundant system for devices with network capability and a method for the same. More particularly, the invention is to establish a redundant connection for the networking devices by defining the roles of ports for each network node.

2. Description of Related Art

Since network applications are widespread, it is more important to provide a safe and reliable network environment. In order to prevent the network from interruption made by any unexpected event, or broken connection subject to any network device's failure, some conventional technologies have provided the redundant mechanisms for every type of network.

Figure 1:
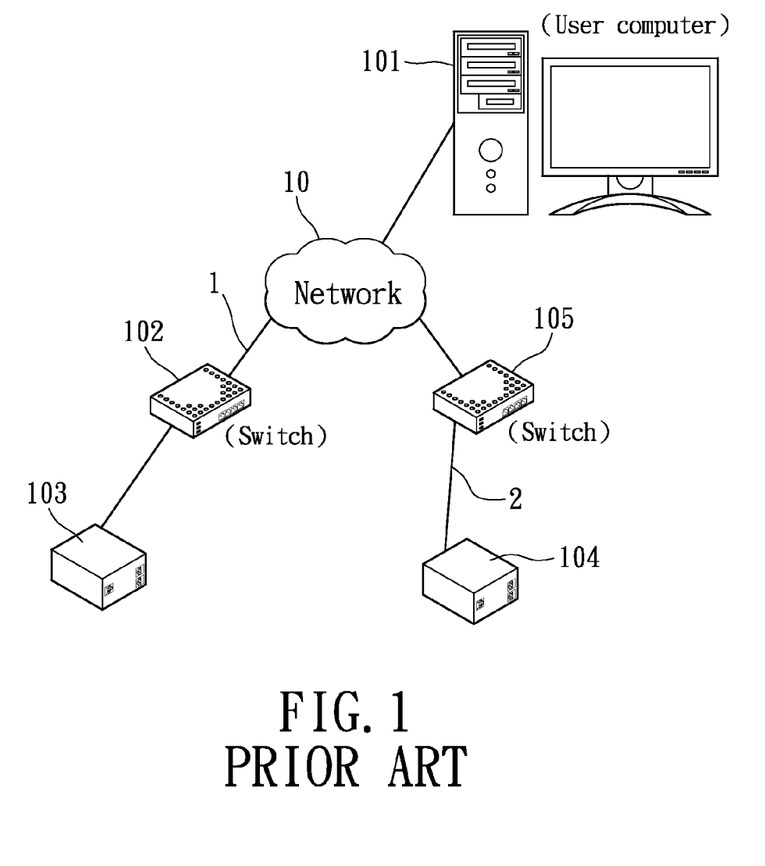
FIG. 1 shows a schematic diagram of a conventional linear-type network framework.

Reference is made to FIG. 1, which shows a framework of a conventional linear-type network. A user computer 101 connects to a remote network device via network 10. The remote network device may be one or more industrial control machines 103, 104, which are used to control various terminal devices. The industrial control machine 103 is connected to the network 10 through a network switch 102, and the machine 104 is through a network switch 105. Under this simple framework, the connection 1 or connection 2 provides no any redundant mechanism. If the connection 1 or connection 2 meets any interruption event, the user computer 101 may not access any one of the industrial control machine 103, 104 via the network 10. One the other hand, if any device on the connection 1 fails, for example, the network switch 102 is caused damage, the user computer 101 likely fails to access the industrial control machine.

With respect to network connection, the often-seen redundant scheme is to provide a redundant network connection besides the original connection. In the current example, the connection 1 and the connection 2 are mutually redundant connection. Further, any terminal device simultaneously has two outward connections (1, 2) through the industrial control machines 103 and 104. If the original connection 1 meets any problem, the connection 2 may take over the connection in order to accomplish the redundant connection. Therefore, the various networking behaviors may not be influenced.

With respect to the network devices, such as a router or a switch, many computers' network connections may be influenced if any device fails. Reference is made to FIG. 1, if the network switch 102 connected to the industrial control machine 103 fails, the user computer 101 may use the network switch 105 on the connection 2 to control the terminal device. Meanwhile, two or more networking devices may achieve the redundant connection.

In addition to the above-described redundant schemes using the various connections or network devices, other conventional technologies may perform the redundancy through various topologic designs of networks. Such as a bus network, two connections are adopted for performing the redundancy. For a ring network, the ring-type connection may provide its own redundant mechanism. For a start network, a mesh network accomplishes the redundancy by various routing schemes.

SUMMARY OF THE INVENTION

To have distinct approach from the conventional technologies, the present invention provides a redundant system for devices with cascade networking capability. The system is applicable to various requirements of redundancy for the networking devices under every type of network topology. When a connection changes, the route for delivering network packets is changed by redefining the roles of network ports of each network node, so as to implement an emergent redundancy. Therefore, the connection for network node or network device may be maintained even though any connection fails or being changed, or any device damages.

According to the embodiment, the redundant method for the devices with cascade networking capability has a first step for initializing a network having at least one network node and plural networking devices. In which, the each network node at least has two network ports and one device port. Such as the network switch, a device port is connected to one or more networking devices. The networking device may be an industrial control machine connected to various terminal devices, or other network devices. The each networking device further has at least two network ports respectively connected toward two different network nodes. In another embodiment, the two network ports on the networking device may simultaneously connect to the ports on the same one network node.

Next, roles of device ports on each network node may be defined based on the content of the broadcast packets on a local area network. The roles may be defined by comparing the broadcast packets. For example, some ports may be defined as forward ports, and some are blocked ports. Every role of port is in charge of different task. The definition of each role of port in the present invention may change the network route for each packet, so as to implement the redundancy.

Each network node periodically broadcasts or receives a connection-confirmation packet which is used for determining whether any connection has change. The change may be any failure of connection or device. Any modification of the connection, such as increasing or decreasing the device on the network, may result in the change. Since the connection is changed, the roles of ports on the relevant network node(s) are re-defined. Meanwhile, the route for delivering the packets is modified for avoiding the original problematic route for redundancy.

A redundant system in accordance with the present invention is further provided to apply the mentioned method for the devices with cascade networking capability.

In one embodiment, the network system has at least two network nodes. Each node includes two or more network ports which are used to connect to other nodes. One or more device ports are also included for connecting the networking device(s). One or more networking devices are included in the system. Each networking device includes at least two network ports respectively connected to the device ports on the network node.

More particularly, an initialized process is performed to define the roles of the device ports based on a network protocol as the network node(s) and the networking device(s) are initially connected. After that, the roles may be re-defined as any connection changes by detection of the broadcast packets. Therefore, the packets routing may be modified.

In one more embodiment, the two network ports of one networking device are respectively connected to the same one network node having at least two different device ports. A plurality of networking devices are particularly adapted. Each networking device has two different network ports connected to the different device ports, so as to form at least one group of networking devices. The network node(s) and the plural networking devices form a local area network which is initially established by defining the roles of device ports. When the change of the connection is detected, the roles of ports are re-defined in order to modify the packet routing for redundancy.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 2:
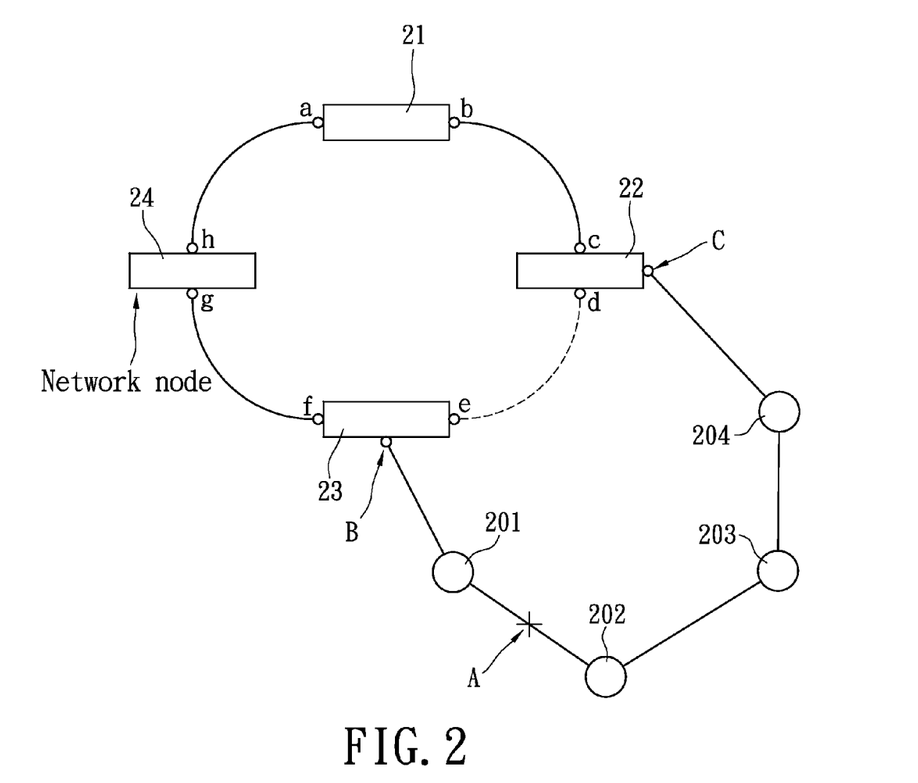
FIG. 2 is one of the schematic diagrams of the network framework of the redundant system for devices with cascade networking capability.

First Embodiment:

Reference is made to FIG. 2 which shows a framework of the network-connection redundant system for devices with cascade networking capability. The system particularly includes a ring-type network formed by a plurality of network nodes 21,22,23,24. The network node is especially a network switch. A plurality of networking devices 201,202,203,204 interconnected between the network node 22 and the network node 23 are also included. The network device is especially an industrial control machine for controlling the various terminal devices, or other types of network devices. Therefore, another type of ring-type network is formed.

More particularly, each network node (21, 22, 23, or 24) has at least two network ports. For example, the shown network node 21 has a port a and a port b, which are respectively connected to a port h of network node 24 and a port c of network node 22. Therefore, a ring-type network with redundant capability is formed. In an exemplary example, when the ring-type network is initialized, the interconnected ports a, b, c, d, e, f, g, h are compared using their MAC addresses in order to define their roles of ports. In the meantime, the intrinsic broadcast storm for the ring-type network should be avoided.

In particular, one of the ports is defined as a blocked port, and others are defined as forward ports. While any one connection fails, that is the network packet may not reach one of the network nodes, the roles of ports may be re-defined. That means the blocked port may be transformed to the forward port. However, the port close to the point of failure shall be transformed to the blocked port in order to maintain the well connection. The remote user(s) may continuously access the resources in this network.

The current embodiment shown in FIG. 2 provides the mentioned redundant scheme for the network nodes (the switches) thereon, additionally, the networking devices in the same network may also work under this redundancy. Each of the shown networking devices 201,202,203,204 at least has different network ports. The network ports are interconnected with each other. A cascade network is formed as a local area network with the network node 22 and network node23. Under this cascade network, the interconnected networking devices 201, 202, 203, 204 are connected toward the device ports B and C of the network node.

At the beginning of establishing the network, the device port B may be defined as a blocked port and the packets may not be forwarded to the networking devices 201,202,203,204 via this port. However, the packets may be forwarded through the network node to the networking devices 201,202,203,204 since the device port C is defined as a forward port. It is worth noting that the defined blocked port and forward port can prevent the broadcast storm subject to the packets looping in the ring-type network.

During the regular operation, each network node will periodically broadcast some packets over the network, such as a connection-confirmation packet which is used to check the connection. Each node may also receive the packets from the others in order to identify with each other.

While any connection fails, for example, a connect point A is broken, both the networking devices 201 and 202 across the two terminals of point A will aware the passing packets may not arrive to the other end. The failure indicates that the external packets may not reach the networking device 201, for example. In the meantime, the blocked port B does not receive the connection-confirmation packet from the forward port C in a predetermined period of time. It shows that any failure of connection happens. The device port B, in accordance with the present invention, may be transformed to a forward port, so the packets may reach the networking devices 202, 203, 204 via the device port C, and further reach to the networking device 201 via the device port B.

The above-described scheme with re-definition of the blocked port to the forward port, it provides the internal devices with a redundant network.

Figure 3:
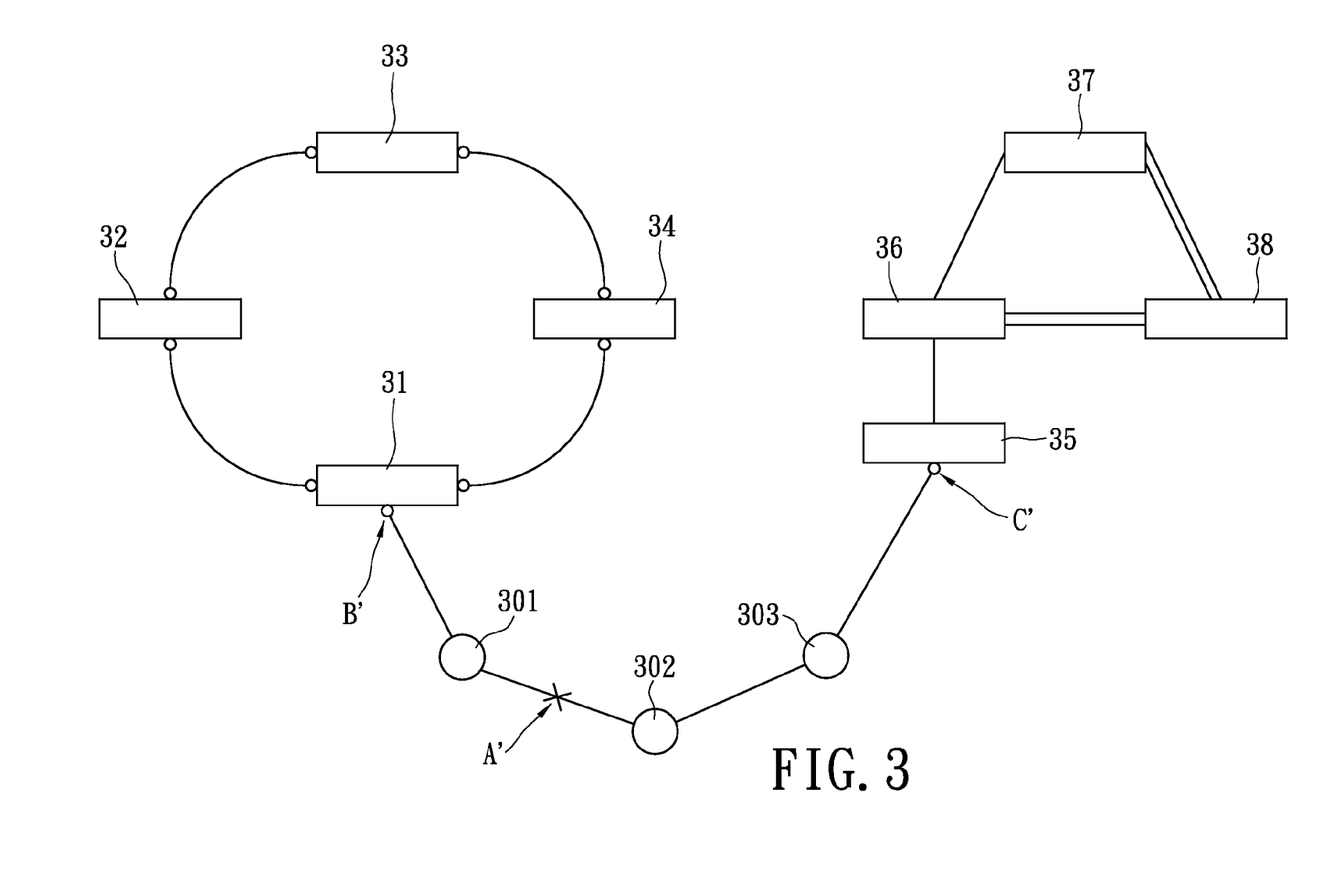
FIG. 3 is second schematic diagram of the network framework of the redundant system for devices with cascade networking capability.

Second Embodiment:

FIG. 3 shows another embodiment of the framework of the redundant system for the devices with cascade networking capability.

The claimed method is not limited to apply to any specific network type. The framework between two different types of network is shown in FIG. 3. In which, a network node is interconnected to two different local area networks which are different types of network. They are one typical ring-type network having network nodes 31,32,33,34 and the other more complex network having network nodes 35,36,37,38. This complex network may be a network type ruled by a Rapid Spanning Tree Protocol (RSTP).

There is a network node 31 within the one network connected to the networking devices 301,302,303. There is another network node 35 within the other one network connected with the networking devices 301,302,303. At least two network ports are included to form a linear type network. The two ends of the linear type network are respectively connected to the device ports of the network nodes 31 and 35.

In accordance with the present invention, when the network nodes 31, 35 and the networking devices 301, 302, 303 are initially connected, the role of each device port will be defined according to the communication protocol. Then the broadcast packet there-between may be used to detect whether any connection changes or not. The changes of connection may be a connection failure, device failure, or connection modification. After that, the roles of ports will be re-defined in order to modify the packets routing.

For example, the device port B' is initially defined as a blocked port, so the external packets may not pass through this device port B' and reach the networking devices 301,302, 303. The device port C' is initially defined as a forward port. When a connect point A' interrupts, and the networking device 301 fails to connect to external, the device port B' will be transformed to a forward port and the passing packets may reach the networking device 301. The example shows the re-definition of roles of ports makes the network to accomplish a redundant mechanism.

Figure 4:
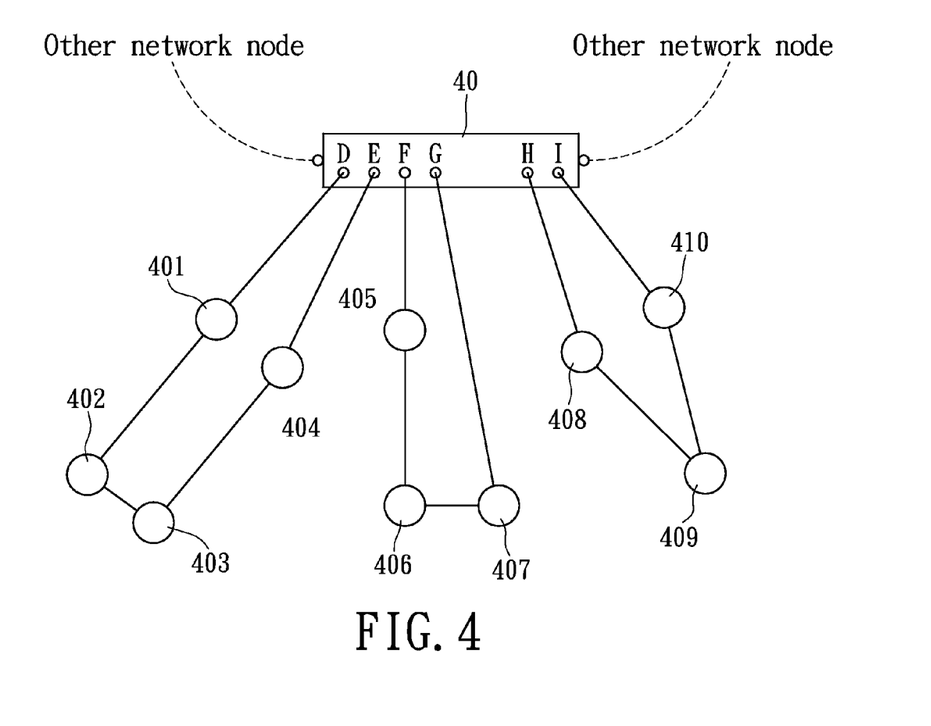
FIG. 4 is third schematic diagram of the network framework of the redundant system for devices with cascade networking capability.

Third Embodiment:

Reference is made to FIG. 4 showing a schematic diagram of framework of the redundant system in accordance with the present invention. The invention may be applied to a network with single network node and its connected networking devices.

According to the diagram, a network node 40 provides a network gateway to external for a plurality of networking devices 401,402,403,404,405,406,407,408,409,410. The network node 40 has two network ports which are respectively connected to two different network nodes, and has device ports to connect with devices in the local area network.

In the current embodiment, each of the networking devices 401,402,403,404 has two network ports. The devices 401, 402,403,404 are interconnected to form a linear type network. The two end of the network are respectively connected to the device ports D, E of the network node 40. The like connection forms a network group. Further, the interconnected networking devices 405, 406, 407 form another local area network (the other network group), and two ends of the network respectively connect to the device ports F,G of the same network node 40. Further, the networking devices 408,409, 410 also form another network group, and two ends of the local area network respectively connect to the device ports H,I.

The two ends of the each network group connect to the same network node 40. The device ports of the network node 40 are firstly defined as different roles of ports. Therefore, it provides the mentioned redundant mechanism.

For example, the device port D is initially defined as a blocked port, and the device port E is defined as a forward port. Then the looping of packets among the devices within one group can be avoided. Moreover, the ID or any number indicating the each port can be referred to determine which port is the blocked port or the forward port. In practice, the number, such as its ID number or MAC address, for each port is compared with another one, and the bigger one may be defined as a blocked port and the smaller one may be a forward port. Therefore, the shown device ports F, G, H, I have their own roles.

When any change of the connection is detected, such as connection is broken, device is failed, or connection is modified, the roles of the device ports need to be re-defined, that is the original blocked port may be redefined as the forward port. Then a redundant route will be established for the network packets.

Fourth Embodiment:

In accordance with the present invention, once the network is established, the roles for each port on the network will be defined. Further embodiment is made to reference shown in FIG. 5.

Figure 5:
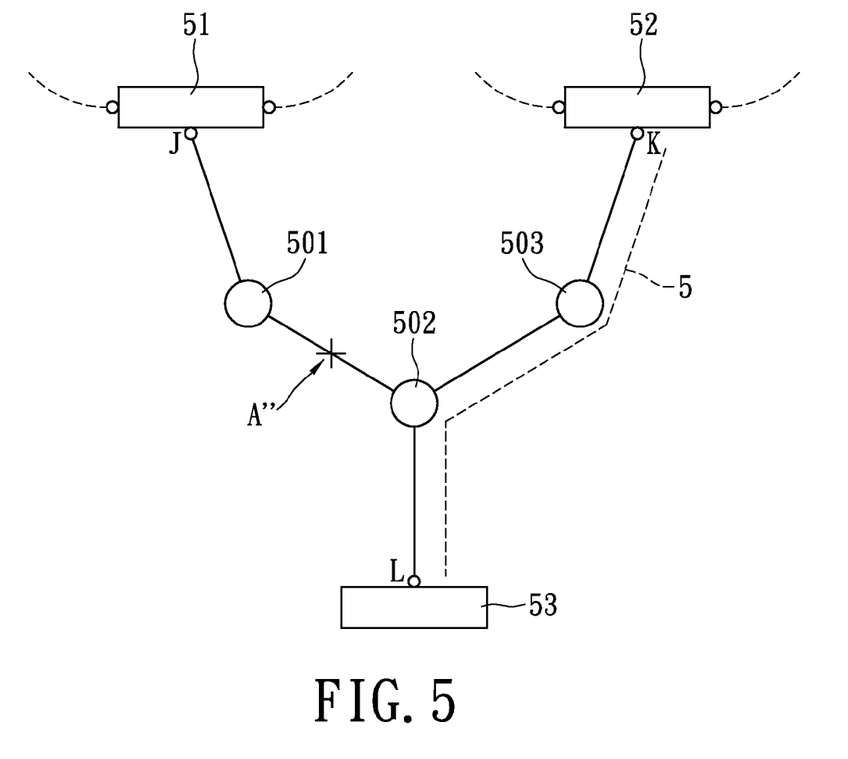
FIG. 5 is fourth schematic diagram of the network framework of the redundant system for devices with cascade networking capability.

The network nodes 51, 52 are respectively connected to the networking devices 501, 502, 503 via the device ports. For example, the device port J of the network node 51 is initially defined as a blocked port. The device port K of the network node 52 is defined as a forward port. In an exemplary example, a network node 53 is temporarily added in the network, and the connection to the networking device 502 is redirected to the network node 53. A connect point A" is then interrupted since the original connection is changed. In the meantime, the system may detect the change, that means the device port J may not receive any packet from the device port K. The device port J is then re-defined as a forward port. Therefore, the networking device 501 may be accessed from a remote user.

Here a connection 5 is established between the network node 52 and the network node 53. For preventing the network from packets looping among the network nodes 52, 53 and the networking devices 502, 503, the roles of both the device port K and the device port L will be respectively re-defined as the blocked port and the forward port.

On the other hand, if any device added or removed from the network, the network framework is changed. In an exemplary example, if any network node is added or removed from the network, the system will detect the change from the broadcast packet. At this moment, the ports of each network node are re-defined.

The mentioned network node is preferably the network switch, which is used for forwarding the packets in the network, and for the gateway among the local area networks. Any remote user may access the networking device(s) through the network switch over the network. The each networking device at least has two network ports respectively connected to the different device ports. One of the objectives of the invention is to define the roles of ports on the different or the same network switch so as to provide the redundant mechanism.

Figure 6:
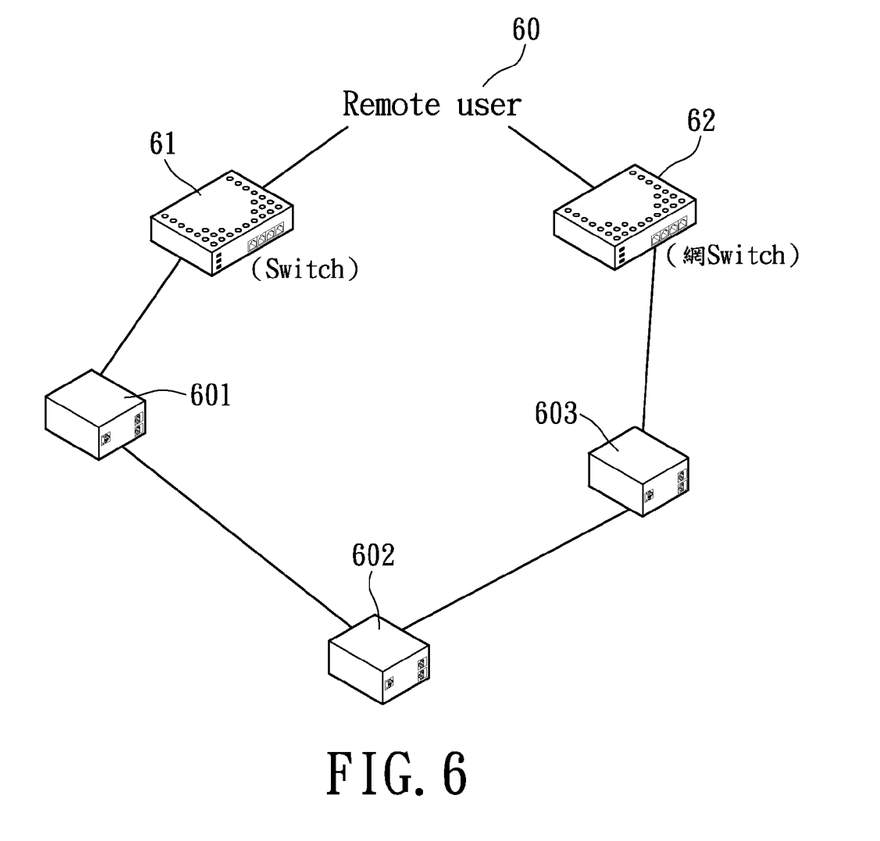
FIG. 6 is a schematic diagram illustrating the network framework of the redundant system for devices with cascade networking capability in accordance with the present invention.

Fifth Embodiment:

The embodiment shown in FIG. 6 is to apply the claimed system to the different types of networks. A remote user 60 simultaneously connects to two different network switches 61, 62 over different connections. For example, the plurality of industrial control machines 601, 602, 603 form a linear-type network, and the two ends of the network are respectively connected to different network switches 61, 62. These two network switches 61, 62 implement the redundant mechanism.

When the network is initially established, the roles of the device ports for each network switch are defined. The broadcast packets among the industrial control machines 601, 602, 603 may be used for checking the status of connection.

The change of the connection may be any failure occurred to the connection among the industrial control machines 601, 602, 603, any failure of device, or any change to the network framework that requires modification. In the meantime, the blocked port may be transformed to the forward port since it does not receive the packet from the forward port in a predetermined period of time. In compliance with a specific network protocol, the roles of ports of the network switch may be re-defined in order to maintain the connection.

Figure 7:
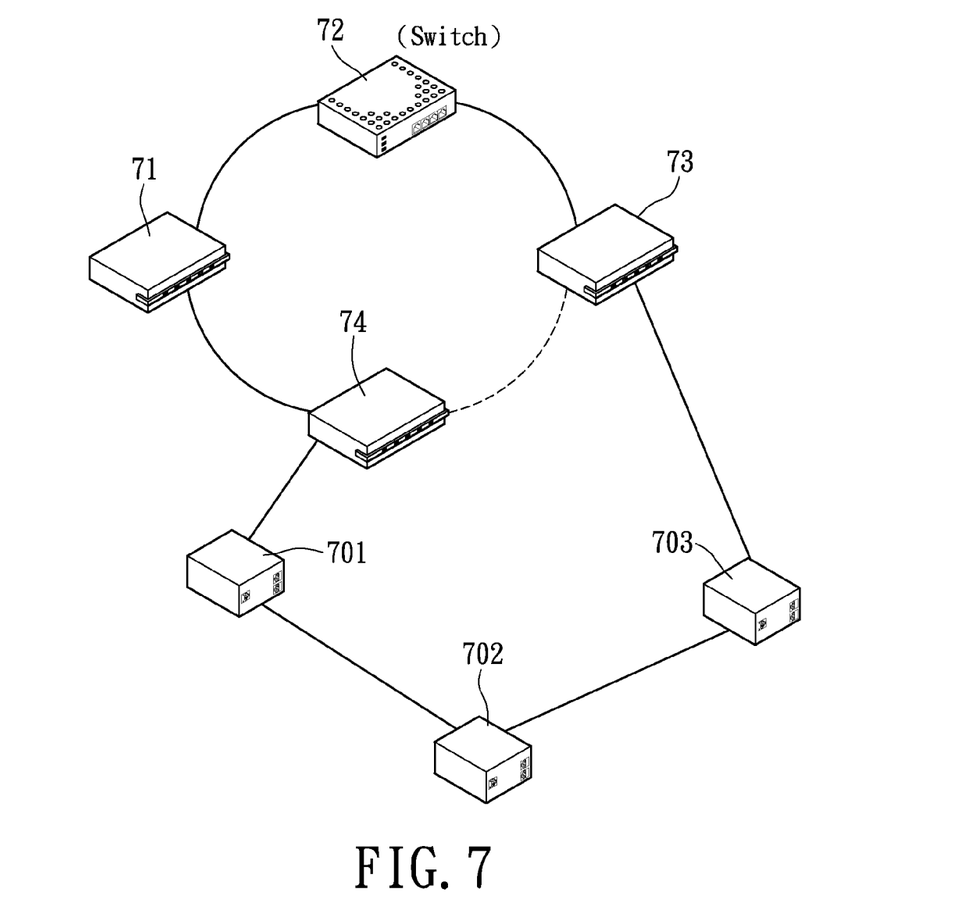
FIG. 7 is a schematic diagram illustrating the network framework of the redundant system for devices with cascade networking capability in accordance with the present invention.

Sixth Embodiment:

FIG. 7 shows an embodiment for the diagram shown in FIG. 2. A plurality of network switches 71, 72, 73, 74 form a ring-type network. In the network, a local area network is constituted of a plurality of networking devices, such as the industrial control machines 701, 702, 703, and two network switches 73, 74. According to the network protocol provided in the present invention, the device port of the network switch 73 and the device port of the network switch 74 are respectively defined as blocked port and forward port as the network is initially established.

If any connection among the industrial control machines 701,702,703 changes through the detection of the broadcast packets, the defined blocked port may not receive any packet from the adjacent device or forward port in a period of time. According to the present invention, the blocked port will be transformed to a forward port.

Figure 8:
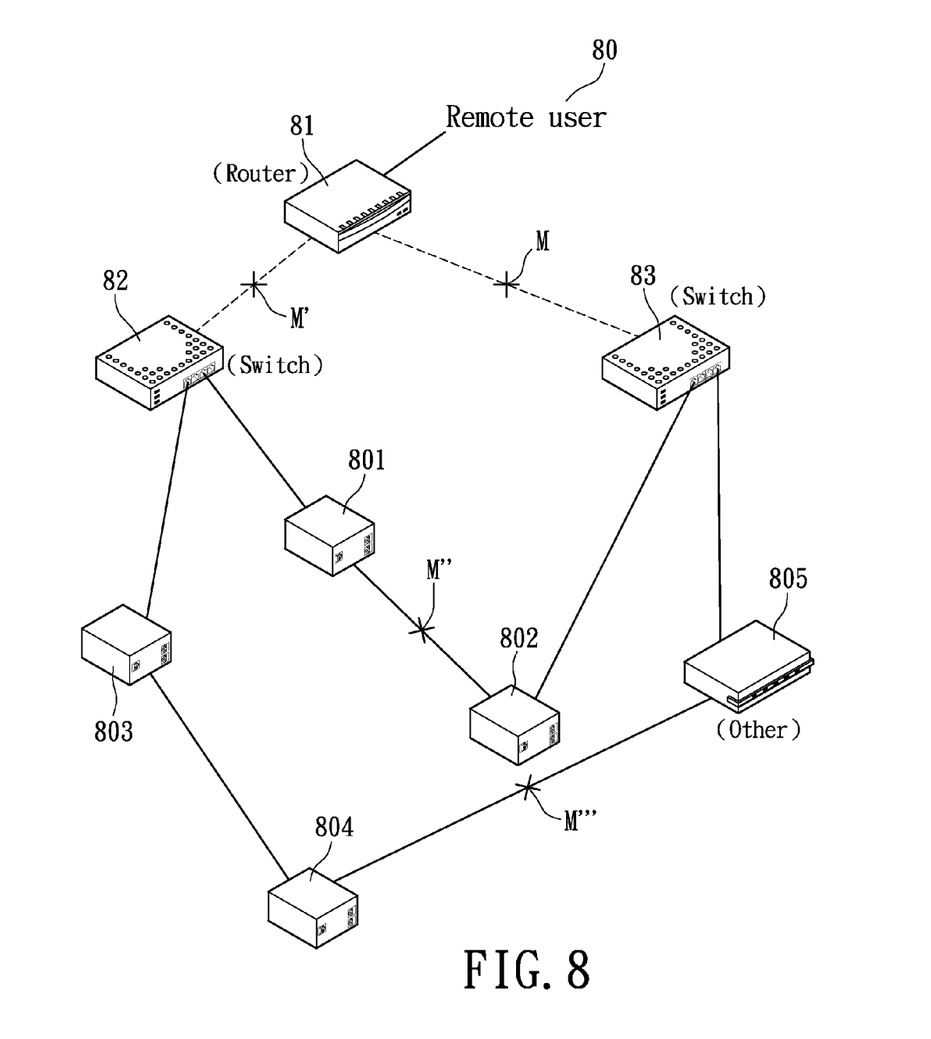
FIG. 8 is a schematic diagram illustrating the network framework of the redundant system with for devices with cascade networking capability in accordance with the present invention.

Seventh Embodiment:

FIG. 8 shows an embodiment of the redundant system for the devices with cascade networking capability. There are two industrial control machines 801, 802 existed to form local area network connected with the network switch 82 and the network switch 83. The established two connections make the system perform redundancy. Another local area network is constituted of the other industrial control machines 803, 804 and the network device 805 which are connected to the network switch 82 and the network switch 83. It is featured that the system provides a various and flexible redundant environment.

In the current embodiment, a remote user 80 connects to the different network switches 82, 83 through a router 81 over the network, in order to access the industrial control machines 801, 802, 803, 804 or the network device 805. Under this network framework, if one of the connect points M and M' on the connections between the router 81 and the network switches 82, 83 is broken, the other one connection may continue the connection. Or alternatively, if the connect point M" between the industrial control machine 801 and the industrial control machine 802 is broken, the route there-between may be modified by re-defining the roles of ports in order to implement the redundancy.

In one more condition, if a connect point M'" on the connection between the industrial control machines 804 and the network device 805 is broken, the roles of the device ports of the network switches 82,83 will be re-defined for continuing the connection.

Figure 9:
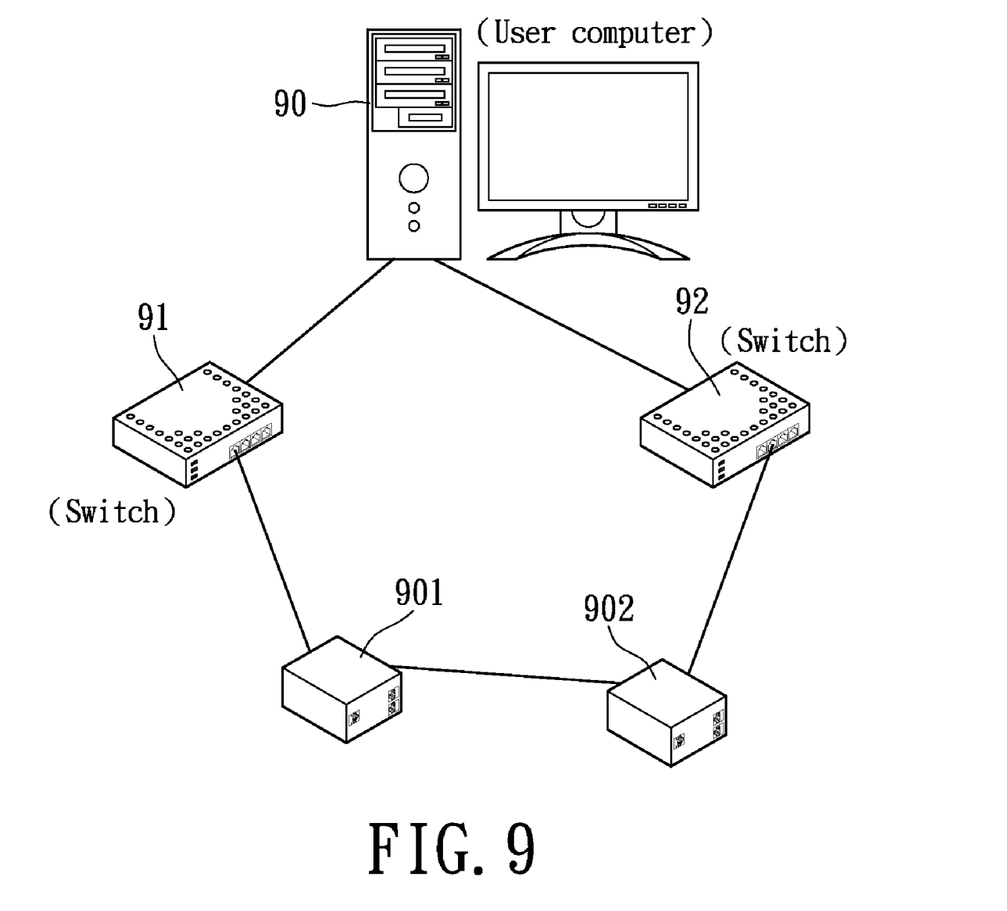
FIG. 9 is a schematic diagram illustrating the network framework of the redundant system for devices with cascade networking capability in accordance with the present invention.

Eighth Embodiment:

FIG. 9 depicts another embodiment in accordance with the present invention. A user computer 90 is equipped with two network cards, which are respectively connected to two different network switches 91, 92. The two connections form a local area network, on which an industrial control machine 901 and an industrial control machine 902 are respectively connected to the network switches 91 and 92. In addition to the redundant mechanism in accordance with the present invention is implemented to the internal network, the user computer 90 may have its redundancy as the two connections connected with the network switches 91 and 92.

Figure 10:
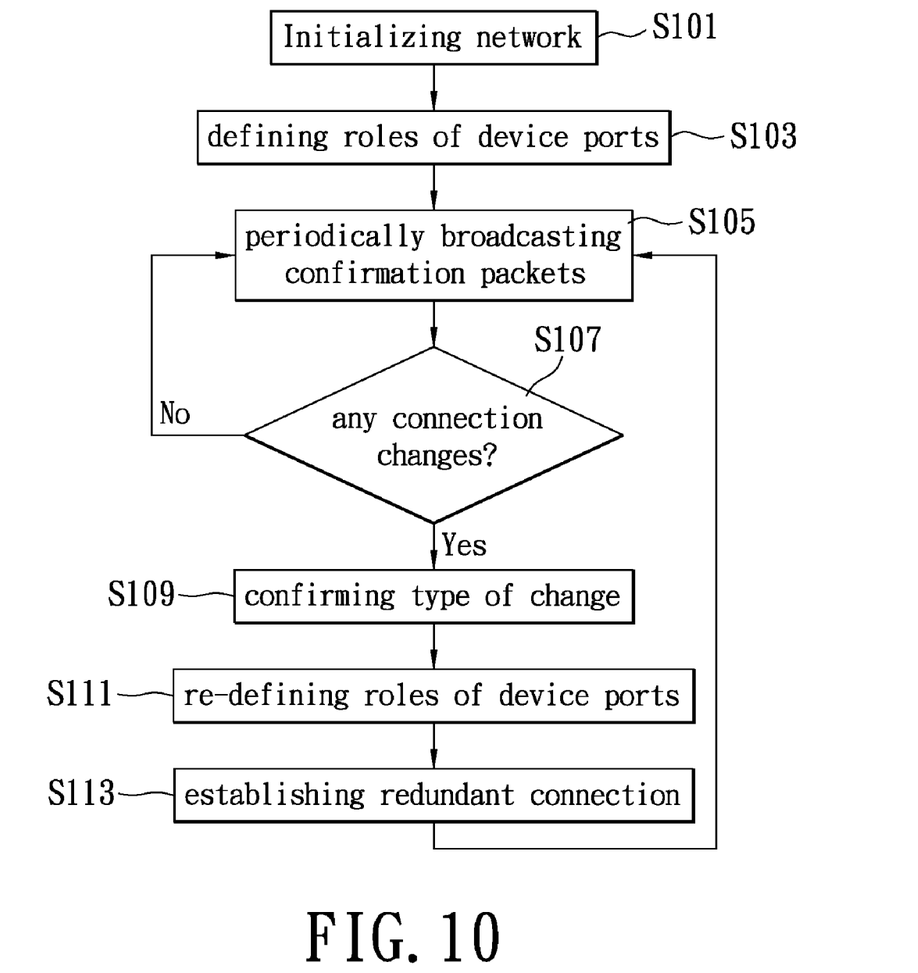
FIG. 10 is a flow chart illustrating the redundant method for devices with cascade networking capability in accordance with the present invention.

According to the above-described various embodiments, it is primarily noted that the roles of ports of the network node, such as the network switch, may be instantly re-defined as another role so as to modify the packet routing when the original connection changes. The instant transformation of the roles of ports implements the redundant mechanism. The related method applied to the redundant system is illustrated in FIG. 10.

One or more network nodes and one or more networking devices form a network. Each network node at least has two network ports and a plurality of device ports. Each networking device at least has two network ports connected with the same one or two different network nodes. In step S101, the network is initialized, and the roles of the device ports on each network node are initially defined according to the comparison result of the packets broadcasted among the devices. The roles of ports include a forward port and a blocked port (step S103).

Next, in step S105, each network node periodically broadcasts or receives the connection-confirmation packet in order to determine whether any connection meets change or not. That means ifs to confirm the connection change by determining whether or not receiving the connection-confirmation packet and its corresponding response (step S107). Such as any failure of connection, damage of device, or any modification of network framework, it makes the connection-confirmation packet or its response abnormal.

Since there is no change by confirming the connection-confirmation packet and its response (no), the step in the method goes to step S105 and continues the detection. The each network node may determine whether there is any change or not by a process of confirming the broadcast packet. If any connection change appears (yes), the next step is to confirm a type of the change, such as the mentioned failure of connection, damage of device or modification of connection (step S109).

Next, the message relating the connection change and the relevant status of the ports of networking device are referred to re-define the roles of device ports of each network node (step S111). Then a redundant connection is established in step S113. In the meantime, the packet routing may be modified in order to avoid the problematic portion of the connection.

To sum up the above description, the redundant system and its method for devices with cascade networking capability are featured that the definition and re-definition of the roles of the device ports of the network node(s) implement by modifying the packet routing.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A network-connection redundant method for devices with cascade networking capability, comprising:
   initializing a network with a plurality of network nodes and one or more networking devices, wherein each network node has at least two network ports and one or more device ports, and each network node connects to the one or more networking devices via the device ports, and the each networking device at least has two network ports connecting the same one or different network nodes, and the networking device connects an external network via the network node; wherein the plurality of network nodes are disposed in two or more local area networks with various network types, and the network nodes are connected across two end ports of the one or more interconnected networking devices;

defining roles of ports for each device port of each network node according to network packets generated by each network node and each networking device, wherein the roles of ports are a plurality of forward ports and one or more blocked ports;

each network node periodically broadcasting to the types of local area networks or confirming receiving a connection-confirmation packet from the local area networks;

determining whether any connection changes according to a relative response packet;

if the connection does not change, continuously broadcasting connection-confirmation packet;

if the connection changes, including failure of connection, failure of device, and modification of connection, redefining the roles of ports for each device port; and accomplishing a redundant connection.

2. The method of claim 1, wherein each network node is a network switch including at least two network ports connected with other one or more network nodes.

3. The method of claim 2, wherein the network ports of the network device respectively connect to two different network switches respectively disposed in the two different types of local area networks.

4. The method of claim 2, wherein the two network ports of the networking device respectively connect to two different device ports of one network switch.

5. A redundant system, which applies the network-connection redundant method for devices with cascade networking capability of claim 1, wherein the system comprises:

at least two network nodes disposed in two or more local area networks with various network types, wherein each network node includes at least two network ports connected with the other network node, and a plurality of device ports;

one or more networking devices, wherein each networking device includes at least two network ports respectively connected to the device ports of the two different network nodes, and the network nodes are connected across two end ports of the one or more interconnected networking devices; wherein, while the local area network with the network nodes and the one or more networking devices initiates a first connection, a role of port for each device port is defined;

the role of port being a forward port or a blocked port for each device port is redefined when change of connection is detected through a broadcast packet, and the change of connection is a failure of connection, a failure of device, or a modification of connection.

6. The system of claim 5, wherein each network node is a network switch.

7. The system of claim 6, wherein the plurality of networking devices form a linear-type network, and two ends of the network respectively connect to two different network switches.

8. A redundant system, which applies the network-connection redundant method for devices with cascade networking capability of claim 1, wherein the system comprises:

a plurality of network nodes, each of them having at least two network ports connected to the other network nodes and a plurality of device ports, and the network nodes disposed in two or more local area networks with various network types;

a plurality of networking devices, wherein each networking device includes at least two network ports, and the plurality of networking devices form at least one networking device group, and two ends of each group respectively connect to two device ports of a network node, and each group forms a local area network; wherein, while the local area network with the network node and the plurality of networking devices initiates a first connection, a role of port for each device port is defined;

the role of port being a forward port or a blocked port for each device port is redefined when change of connection is detected through a broadcast packet, and the change of connection is a failure of connection, a failure of device, or a modification of connection.

9. The system of claim 8, wherein the network node is a network switch.

* * * * *